United States Patent
Naik et al.

(10) Patent No.: US 11,823,479 B2
(45) Date of Patent: Nov. 21, 2023

(54) SYSTEM AND METHOD TO PREDICT PARTS DEPENDENCIES FOR REPLACEMENT BASED ON THE HETEROGENOUS SUBSYSTEM ANALYSIS

(71) Applicant: KONINKLIJKE PHILIPS N.V., Eindhoven (NL)

(72) Inventors: Sarif Kumar Naik, Bangalore (IN); Vidya Ravi, Bangalore (IN); Ravindra Balasaheb Patil, Bangalore (IN); Meru Adagouda Patil, Bangalore (IN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 32 days.

(21) Appl. No.: 17/615,299

(22) PCT Filed: Jun. 2, 2020

(86) PCT No.: PCT/EP2020/065204
§ 371 (c)(1),
(2) Date: Nov. 30, 2021

(87) PCT Pub. No.: WO2020/249429
PCT Pub. Date: Dec. 17, 2020

(65) Prior Publication Data
US 2022/0222959 A1 Jul. 14, 2022

Related U.S. Application Data

(60) Provisional application No. 62/859,221, filed on Jun. 10, 2019.

(51) Int. Cl.
*G06V 30/00* (2022.01)
*G06V 30/422* (2022.01)
(Continued)

(52) U.S. Cl.
CPC .......... *G06V 30/422* (2022.01); *G06V 10/426* (2022.01); *G06V 10/82* (2022.01); *G06V 30/18076* (2022.01); *G06V 30/222* (2022.01)

(58) Field of Classification Search
CPC .... G06V 10/82; G06V 30/422; G06V 10/806; G06V 10/426; G06V 30/10; G06V 10/44;
(Continued)

(56) References Cited

U.S. PATENT DOCUMENTS 6,442,542 B1  8/2002  Ramani
2004/0153819 A1  8/2004  Bjorsne
(Continued)

OTHER PUBLICATIONS

Antoine, D., Collin, S., Tombre, K.: Analysis of Technical Documents: The REDRAW System. In: Baird, H.S., Bunke, H., Yamamoto, K. (eds.) Structured Document Image Analysis, pp. 385-402. Springer, Heidelberg (Year: 1992).*
(Continued)

*Primary Examiner* — Nay A Maung
*Assistant Examiner* — Xiao Liu

(57) ABSTRACT

A non-transitory computer readable medium (107, 127) stores instructions executable by at least one electronic processor (101, 113) to perform a component co-replacement recommendation method (200). The method includes: identifying components of a medical device by analyzing a technical document (130) related to the medical device; identifying component symbols (132) representing the components in drawings of the technical document; extracting relationships between the components of the medical device based on graphical connections (136) between the component symbols in the drawings of the technical document; generating a component connections graph (124) representing the relationships between the components of the medical device, the graph including nodes (138) corresponding to the components and connections (136) between the compo-
(Continued)

nents; receiving an identification of a component to be replaced; and determining a co-replacement recommendation (122) for the component to be replaced based on the component connections graph.

15 Claims, 5 Drawing Sheets

(51) Int. Cl.
G06V 10/82 (2022.01)
G06V 30/18 (2022.01)
G06V 10/426 (2022.01)
G06V 30/222 (2022.01)

(58) Field of Classification Search
CPC ............... G06V 30/1988; G06V 30/40; G06V 30/1983; G06V 30/18076; G06V 30/222; G06Q 10/20; G06Q 30/0281; G06Q 30/0631; G06Q 30/0643
See application file for complete search history.

(56) References Cited

U.S. PATENT DOCUMENTS

| 2004/0193958 | A1  | 9/2004  | Shah    |             |
|--------------|-----|---------|---------|-------------|
| 2011/0029824 | A1* | 2/2011  | Scholer | G05B 23/0224 |
|              |     |         |         | 714/E11.178 |
| 2011/0141912 | A1* | 6/2011  | Soures  | G06F 11/0733 |
|              |     |         |         | 370/242     |
| 2011/0302461 | A1  | 12/2011 | Goertler |            |
| 2018/0121793 | A1  | 5/2018  | Bhandary |            |
| 2018/0286510 | A1* | 10/2018 | Kwan    | G06Q 10/20  |
| 2020/0410163 | A1* | 12/2020 | Shah    | G06F 9/5072 |

OTHER PUBLICATIONS

Llados at al, Symbol recognition by error-tolerant subgraph matching between region adjacency graphs, IEEE Transactions on Pattern Analysis and Machine Intelligence, vol. 23, No. 10, pp. 1137-1143, Oct. 2001.*

Llados at al, Symbol recognition using graphs, Proceedings 2003 International Conference on Image Processing, Sep. 14-17, 2003.*

Li et al. Gated graph sequence neural networks arXiv:1511.05493 (Year: 2017).*

Llados at al, Symbol recognition using graphs, Proceedings. International Conference on Image Processing, Sep. 14-17, 2003.*

Aumayr et al., Probabilistic Knowledge-Graph based Workflow Recommender for Network Management Automation, 2019 IEEE 20th International Symposium on "A World of Wireless, Mobile and Multimedia Networks" (WoWMoM) (pp. 1-7) (Year: 2019).*

International Search Report and Written Opinion dated Jul. 30, 2020 for International Application No. PCT/EP2020/065204 Filed Jun. 2, 2020.

Tombre, et al: "Pattern Recognition Methods for Querying and Browsing Technical Documentation", Sep. 9, 2008.

* cited by examiner

SYSTEM AND METHOD TO PREDICT PARTS DEPENDENCIES FOR REPLACEMENT BASED ON THE HETEROGENOUS SUBSYSTEM ANALYSIS

CROSS REFERENCE TO RELATED APPLICATIONS

This application is the U.S. National Phase application under 35 U.S.C. § 371 of International Application No. PCT/EP2020/065204 filed Jun. 2, 2020, which claims the benefit of U.S. Provisional Patent Application Number 62/859,221 filed Jun. 10, 2019. These applications are hereby incorporated by reference herein.

FIELD

The following relates generally to medical imaging device servicing arts, part replacement recommendation systems, and related arts.

BACKGROUND

Medical imaging devices (e.g., magnetic resonance (MR), positron emission tomography (PET), computed tomography (CT), interventional-X ray, etc.) are composed of hundreds of individual parts. Typically, these devices have a life span of more than a decade. During the life span, these devices undergo numerous maintenance activities according to interval-based service schedules that involves calibrating the particular parts, lubrication, minor repairs etc. In some service activities, the service engineer (SE, also referred to herein as a field SE or FSE, or a remote SE (RSE)) replaces a particular part or set of parts that are deemed not fit for further usage. Unscheduled servicing is also performed on an as-needed basis, such as when a part malfunctions it may be repaired or replaced.

Typically, medical imaging devices are also configured to automatically maintain a machine log (or logs) for the imaging device, which logs information such as operating settings, executed imaging sequences, or so forth. A service log is also usually maintained manually and/or automatically, for example when a SE performs scheduled or unscheduled servicing on the imaging device the SE enters a record of the performed service in the service log.

The following discloses certain improvements to overcome these problems and others.

SUMMARY

In one aspect, a non-transitory computer readable medium stores instructions executable by at least one electronic processor to perform a component co-replacement recommendation method. The method includes: identifying components of a medical device by analyzing a technical document related to the medical device; identifying component symbols representing the components in drawings of the technical document; extracting relationships between the components of the medical device based on graphical connections between the component symbols in the drawings of the technical document; generating a component connections graph representing the relationships between the components of the medical device, the graph including nodes corresponding to the components and connections between the components; receiving an identification of a component to be replaced; and determining a co-replacement recommendation for the component to be replaced based on the component connections graph.

In another aspect, a service device includes: a display device; at least one user input device; and at least one electronic processor programmed to: receive, via the at least one user input device, an identification of a component of a medical device to be replaced; generate a co-replacement recommendation for the component to be replaced based on a component connections graph; and provide, on the display device, the co-replacement recommendation.

In another aspect, a component co-replacement recommendation graph generation method includes: identifying a plurality of components of a medical device by analyzing one or more drawings of a technical document related to the medical device; extracting a relationship between each component of the plurality of components of the medical device indicative of co-replacement recommendations amongst each component identified from the technical information; generating a component co-replacement recommendation graph showing the relationships between each component of the plurality of components of the medical device, the graph including nodes corresponding to the components and connections shown between the components; receiving, via at least one user input device, an identification of a component of the medical device to be replaced; generating a co-replacement recommendation for the component to be replaced based on a component connections graph representing relationships between components of the medical device that includes the component to be replaced, the graph including nodes corresponding to components of the medical device and connections between pairs of components the connections representing distances between the components of the connection in the one or more drawings of the technical document; and providing, on a display device, the component co-replacement recommendation.

One advantage resides in providing improved medical imaging device maintenance including cost savings by improved diagnostics, reducing the amount of unused parts, and reducing the number of service trips by a SE.

Another advantage resides in reducing the unnecessary replacement of parts of a medical imaging device.

Another advantage resides in providing co-replacement recommendations based on an identification of which parts have a high co-replacement frequency and further based on automated determination of functional relationships between parts.

Another advantage resides in the ability to provide a suggestion for a service order in which multiple parts may be replaced in an effort to solve an issue, thus solving the issue as soon as possible.

Another advantage resides in the shortening repair time and decrease the downtime of a system.

Another advantage resides in providing an improved parts ordering device that provides guidance to the SE.

Another advantage resides in providing dynamic feedback with respect to dependent sub-components of a medical imaging device, predicting necessity of carrying certain set of parts there by enhances service workflow as well as reducing system downtime at customer site.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
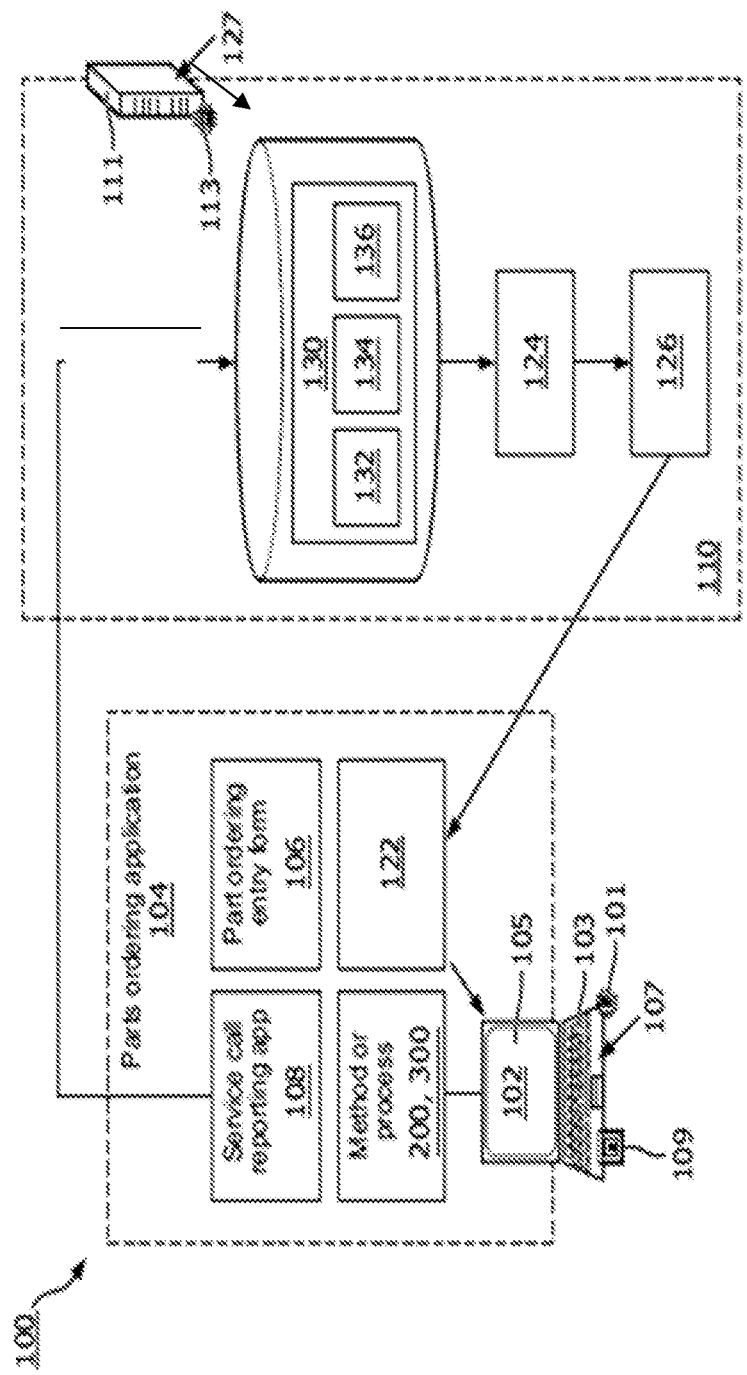
FIG. 1 diagrammatically illustrates an illustrative system for providing co-replacement part recommendations of a medical imaging device in accordance with the present disclosure.

Over the course of time, the status of many medical imaging devices becomes such that few parts have been replaced more than once while some parts are never replaced. Even though these medical imaging devices are designed and manufactured by considering possible use factors (e.g., wear and tear during usage), different environmental conditions (e.g., operating temperature, humidity, fluctuation in input current and voltage etc.) can still cause components of the medical imaging devices to need to be replaced.

It is not typically possible to predict and design precisely how these devices can be used in real-life. Another aspect that can impact the kind(s) of parts that need replaced is the interconnectedness (physical and functional relationships) between the parts of the medical imaging devices. For example, suppose one part (Part X) gets replaced at time $T_1$ and after a certain time $\Delta T$ another part (Part Y) gets replaced at time $T_2$. If the parts X and Y are related, then any change in one of them may affect the other in a way which leads to early failure of the other part. If the SE is aware of such a relationship between the parts, then the SE may decide to replace both parts X and Y even if the latter part Y has not (yet) failed. However, this approach of taking into consideration interrelationships of parts may increase unnecessary service costs if the model of interrelationship is inaccurate or does not hold true in certain medical imaging devices.

Moreover, in practice the SE usually does not have comprehensive information about the interrelationships of parts, and at best may consider such interrelationships on an ad hoc basis relying upon the SE's personal experience. For example, if the SE recalls instances in which a service call in which part X was replaced was later followed by a service call in which part Y was replaced, and if the SE further recognizes a physical or functional relationship between parts X and Y based on the SE's personal knowledge of how the imaging device operates, then the SE might elect to co-replace part Y when replacing part X. This may or may not be the right decision (even in a statistical sense) as it is based on a limited dataset of individual experience and knowledge.

A second issue with part replacements is that sometimes after the replacement of one part (Part A), some other part (Part M) may fail. A third issue is that introduction of a new part may have adverse effect on the stability of the whole medical imaging device because the performance of the changed part may be higher compared to other parts. The parts A and M may not be related to one another. In such cases, the SE needs to visit the site of the medical imaging device multiple times to fix both components.

Medical devices, such as imaging systems are relatively complex, and with use over time, may experience a fault. Upon discovering a system malfunction or fault, the hospital or other user of the imaging device may initiate a service work order, also known as a service call, with a service provider. In some cases, the service provider is an entity related to the original equipment manufacturer and/or has established a contractual service relation to the end user hospital.

Upon initiation of a service call, remote diagnosis and resolution may initially be attempted. However, in many cases this is unsuccessful, and a SE may then travel to the site of the malfunctioning medical imaging device, such as the hospital where the equipment is housed. At this time, the SE will investigate the malfunctioning medical imaging device and determine the root cause of the problem. The SE will then determine whether one or more parts should be replaced in an effort to resolve the issue, and if so, which part(s). Typically, the SE will utilize a tablet computer or cellphone with wireless (e.g. Wi-Fi and/or cellular) connectivity, or a control computer of the medical imaging device being serviced, or some other network-enabled electronic device, to access a parts ordering website or other a parts ordering backend hosted by a server computer, or other electronic resource of the service provider in order to place an order for the replacement part(s) to be delivered to the hospital or other site of the imaging device under service.

The following relates to providing co-replacement recommendations to SEs. This recommender system or subsystem may be integrated with the parts ordering website or backend, although a standalone co-replacement recommender application or website is also or alternatively contemplated. The recommender leverages interrelationships of components derived from design documents, service manuals, or other system documentation. If historical co-replacement information is available, this may also be leveraged by the recommender.

Technical documents related to the medical device generally include system diagrams, drawings, or other images that depict various components and their interconnections, along with textual content (e.g. natural language sentences, phrases, paragraphs, figure captions, numbered lists, bullet lists, and/or so forth) describing content of the diagrams, drawings, or other images. For example, drawings may be provided for various modules. Some or all components in a drawing may be labeled with text labels (which may be represented as image content, e.g. bit maps depicting the text, and/or by embedded text, e.g. ASCII text anchored at a particular location in the image), and the drawings are usually referenced in text paragraphs of the technical document by image identifier (e.g., "FIG. 2A", "Schematic 7", or so forth) that is also included in a figure caption commonly (although not necessarily) located above or below the image. Using natural language processing (NLP) applied to text in the body and in the images (possibly after optical character recognition, OCR, in the case of bit mapped text labels in images without native embedded text), image identifiers and component names are extracted, and text and images are linked based on the image identifiers and/or component names contained in both the image and a text paragraph. In one approach, the images (with native or OCR'd embedded text) are processed by a convolutional neural network (CNN) to extract the component names. The component symbols (diagrammatic boxes or more complex component representations) and connector lines or arrows are delineated in the images, for example using a Hough transform, and component symbols are associated with component names based on spatial proximity of the text to the extracted component symbols in the images. For a component that is not labeled in the image, text paragraphs associated with the image may be used to generate a component name. The extracted connector arrows or lines then provide directed or undirected connections, respectively, between the components.

In the next step, the above-extracted information is represented as a directed graph having named nodes corresponding to the named components and connections between nodes corresponding to the extracted directed or undirected connections. Undirected connections can be represented in the directed graph as bidirectional arrows.

Next, the shortest distance between each directed pair of components ("directed" in the sense that the directed pair A→B is different from the directed pair B→A) is determined so as to generate a distances matrix, for example using the Floyd-Warshall algorithm. Any directed component pair having no path between the components of the pair is identified in the distances matrix as a null, very large or infinite distance, or other designation. The distances can be used as weights, i.e. the shorter the (shortest) distance between the directed pair A→B the more likely it is that B should be replaced along with A.

If historical co-replacement data is available, this can be leveraged in combination with the directed graph to provide the co-replacement recommendations. In one illustrative approach, the graph is employed to identify the subset of components that are connected with the component being replaced (or, in a variant embodiment, to identify the subset of components that are connected with the component being replaced by less than some maximum distance). Thereafter, the historical co-replacement data is applied only to that subset of components to generate the co-replacement recommendations. In another illustrative approach, the co-replacement data may be used to adjust the weights between directed component pairs, so that for example the weights are some combination of the shortest path and the co-replacement statistics.

With reference to FIG. 1, an illustrative system 100 for providing co-replacement part recommendations of a medical imaging device (not shown—also referred to as a medical device, and imaging device, imaging scanner, and variants thereof) is diagrammatically shown. As shown in FIG. 1, the system 100 includes a service device 102 carried or accessed by a SE. The service device 102 can be a personal device, such as a mobile computer system such as a laptop or smart device. In other embodiments, the service device 102 may be an imaging system controller or computer integral with or operatively connected with the imaging device undergoing service (e.g., at a medical facility). As another example, the service device 102 may be a portable computer (e.g. notebook computer, tablet computer, or so forth) carried by an SE performing diagnosis of a fault with the imaging device and ordering of parts. In another example, the service device 102 may be the controller computer of the imaging device under service, or a computer based at the hospital. The service device 102 is programmed to run a parts replacement application 104 that, among other functionality, provides a parts ordering entry form 106. In other embodiments, the service device may be a mobile device such as a cellular telephone (cellphone) or tablet computer and the parts ordering application 104 may be embodied as an "app" (application program). It is also contemplated for the parts ordering application 104 to be a component of a more comprehensive application, e.g. which includes other components for interfacing with a service log (such as an illustrative service call reporting application 108) or so forth. The parts ordering application 104 presents a user interface which is displayed on a display device 105 associated with the service device 102. The SE may interact with the parts ordering application 104 via at least one user input device 103 such a mouse, keyboard or touchscreen. The service device further includes an electronic processor 101 and non-transitory storage medium 107 (internal components which are diagrammatically indicated in FIG. 1). The non-transitory storage medium 107 stores instructions which are readable and executable by the electronic processor 101 to implement the parts ordering application 104. The service device may also include a communication interface 109 such that the service engineer may communicate with a backend server or processing device 111. Such communication interfaces 109 include, for example, a wireless Wi-Fi or 4G interface, a wired Ethernet interface, or the like for connection to the Internet and/or an intranet. Some aspects of the parts ordering application 104 may also be implemented by cloud processing or other remote processing.

After a determination of the part or parts to be replaced, an SE enters an identification (e.g., identification number or code or the like associated with the part, such as a part number or stock keeping unit (SKU) code) of the part to be ordered into a part order entry form 106 in the parts ordering application 104. The SE enters the part number into the entry form 106 via a user input device 103 of the service device 102. The identification is received by the backend server 111, and is used to generate a co-replacement recommendation 122 using a component connections graph 124 (which is generated by the backend server, as described in more detail below; in some alternative embodiments the component connections graph 124 may reside solely at the backend server 111 and not at the service device 102). The generated co-replacement recommendation 122 is provided on the display device 105 of the service device 102.

The component connections graph 124 represents relationships between components of the medical imaging device that includes the component to be replaced. As described in more detail below, the component connections graph 124 includes nodes corresponding to components of the medical device and connections between pairs of components. The connections are preferably directed connections (although some or all connections being undirected is a contemplated variant). Each connection between a pair of components represents the strength of relationship between the two components of the pair. A connection may be viewed as representing a "distance" between the components of the connection in one or more drawings of a technical document related to the medical device. The "distance" in some embodiments is quantified by a count of intervening components between the components of the pair in the drawing, so that two components that are directly connected by a connecting line or arrow will have the shortest "distance" between them; whereas two components that are indirectly connected via a plurality of lines or arrows connecting intervening components has a longer "distance" between them.

In some embodiments, in addition, to using the component connections graph 124 in making co-replacement recommendations, the service device 102 and/or backend 111 is programmed to further generate the co-replacement recommendation 122 using historical co-replacement data related to the components. This historical co-replacement data can be retrieved from a database (e.g., from the backend server 111 or the non-transitory storage medium 107).

The co-replacement recommendation 122 can encompass a recommendation which (i) does not include any identified co-replacements (in which case it may optionally not be displayed to the SE); (ii) a recommendation of a single co-replacement part, or (iii) a recommendation of two or more replacement parts.

Additionally, in illustrative FIG. 1, the servicing information collected using the service call reporting app 108 is fed to a co-replacements database backend 110 (e.g., implemented at a medical facility or other remote center from where the SE is performing the service call). The backend processing is performed on the backend server 111 equipped with an electronic processor 113 (diagrammatically indicated internal component). The server 111 is equipped with non-transitory storage medium 127 (internal components which are diagrammatically indicated in FIG. 1). While a single server computer is shown, it will be appreciated that the backend 110 may more generally be implemented on a single server computer, or a server cluster, or a cloud computing resource comprising ad hoc-interconnected server computers, or so forth.

To generate the component connections graph 124, and use the graph to determine the co-replacement recommendation 122, the non-transitory storage medium 127 stores instructions executable by the electronic processor 113 of the backend server 111 to perform a component co-replacement recommendation method 200. In some examples, the method 200 may be performed at least in part by cloud processing. In general, the component connections graph 124 is pre-computed based on technical document(s), and thereafter is accessed and used by the co-replacements recommendation processing. The graph 124 may be occasionally updated, e.g. as updates to technical documents become available.

Figure 2:
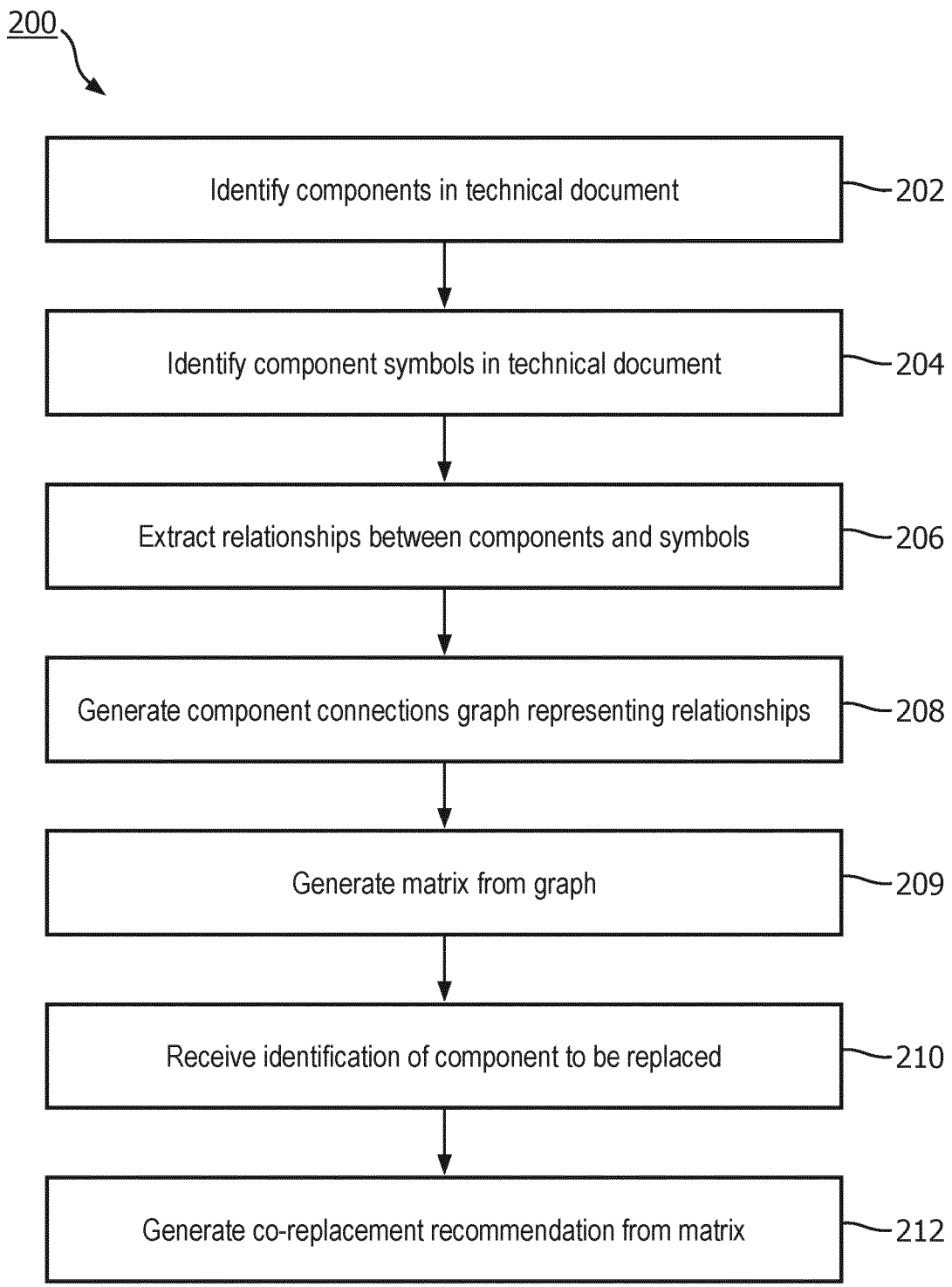
FIG. 2 shows exemplary flow chart operations of the system of FIG. 1.
Figure 3:
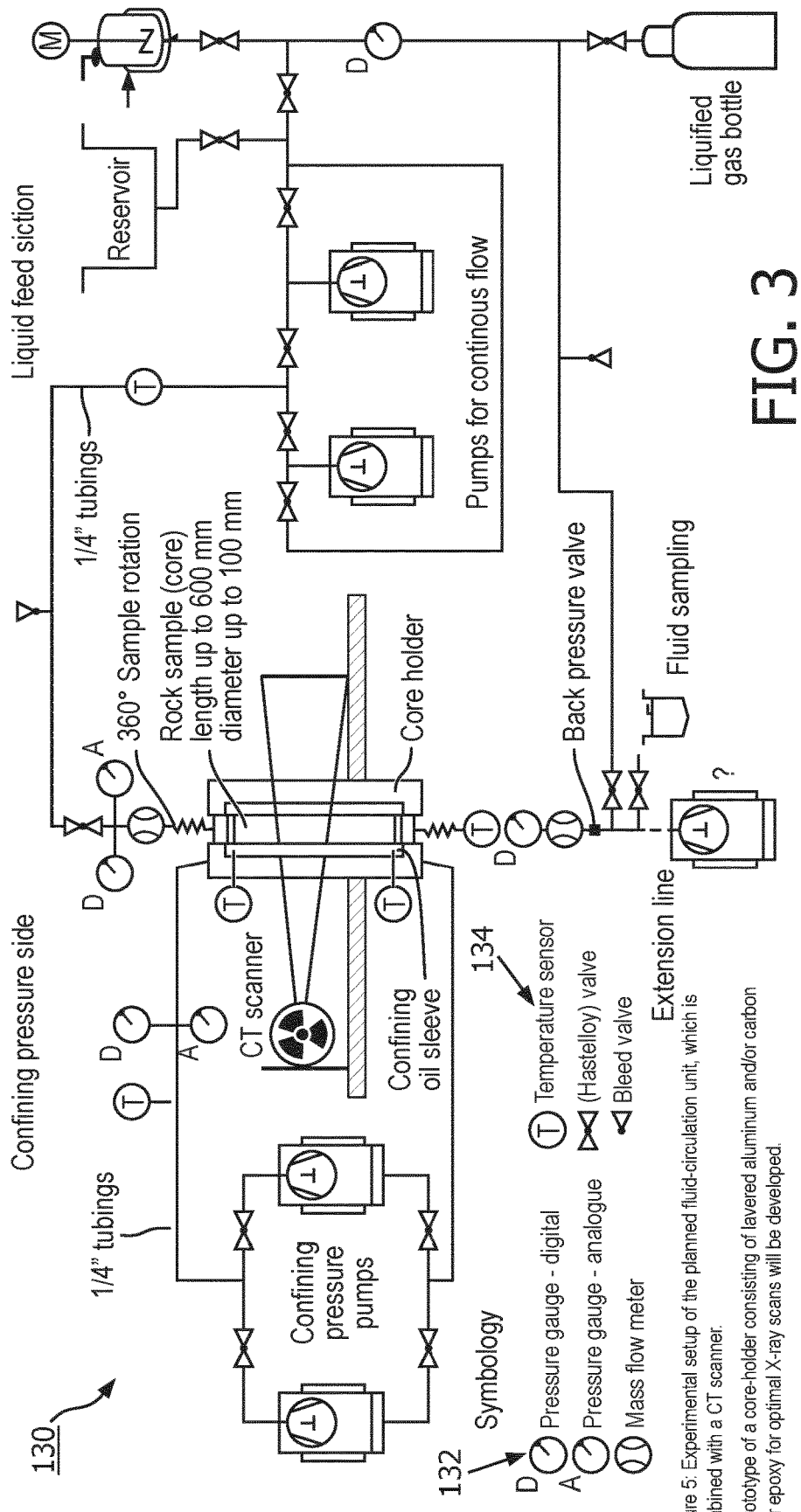
FIG. 3 shows an example technical document with component symbols extracted by the system of FIG. 1.
Figure 4:
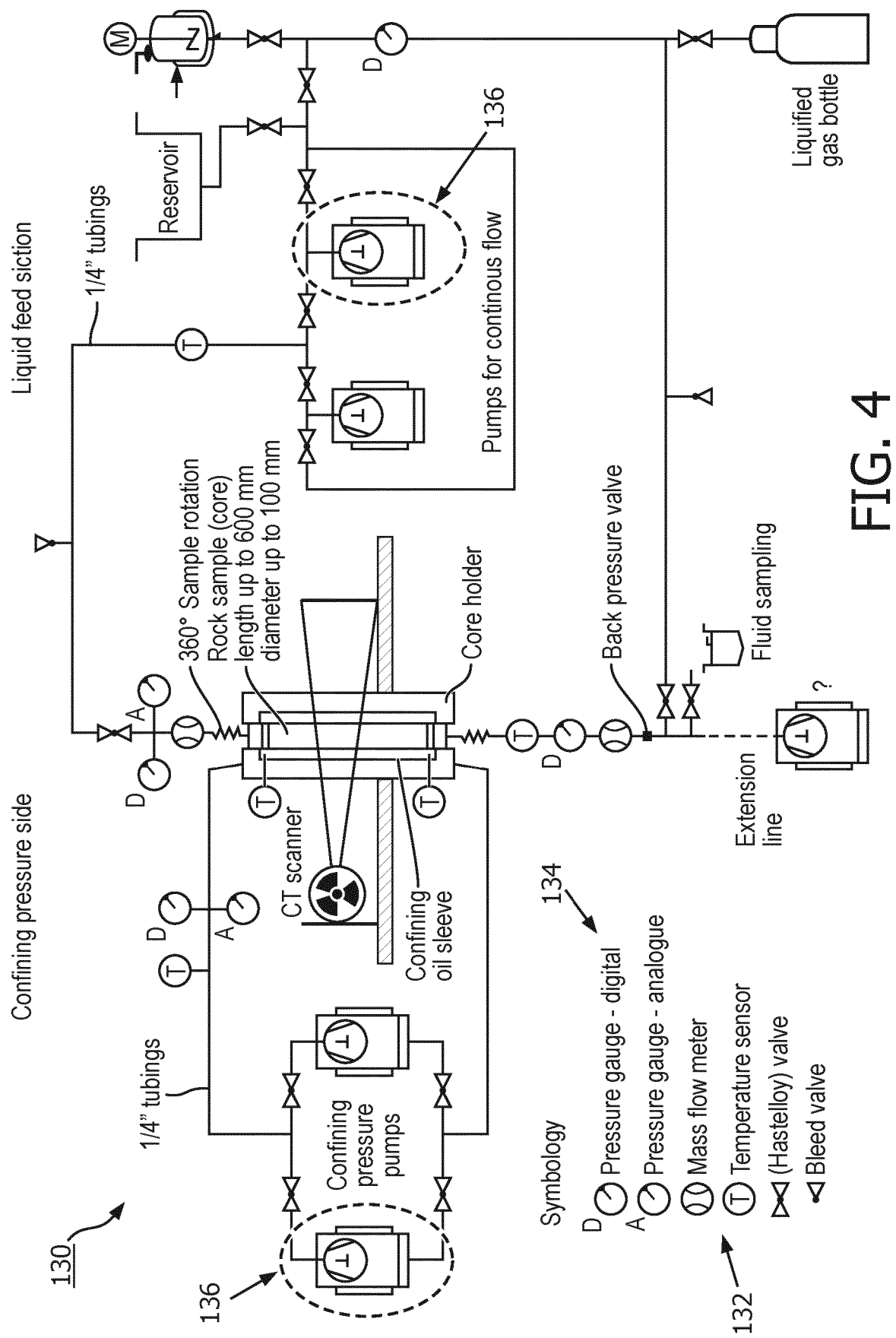
FIG. 4 shows the technical document of FIG. 3 with relationships extracted between the component symbols.
Figure 5:
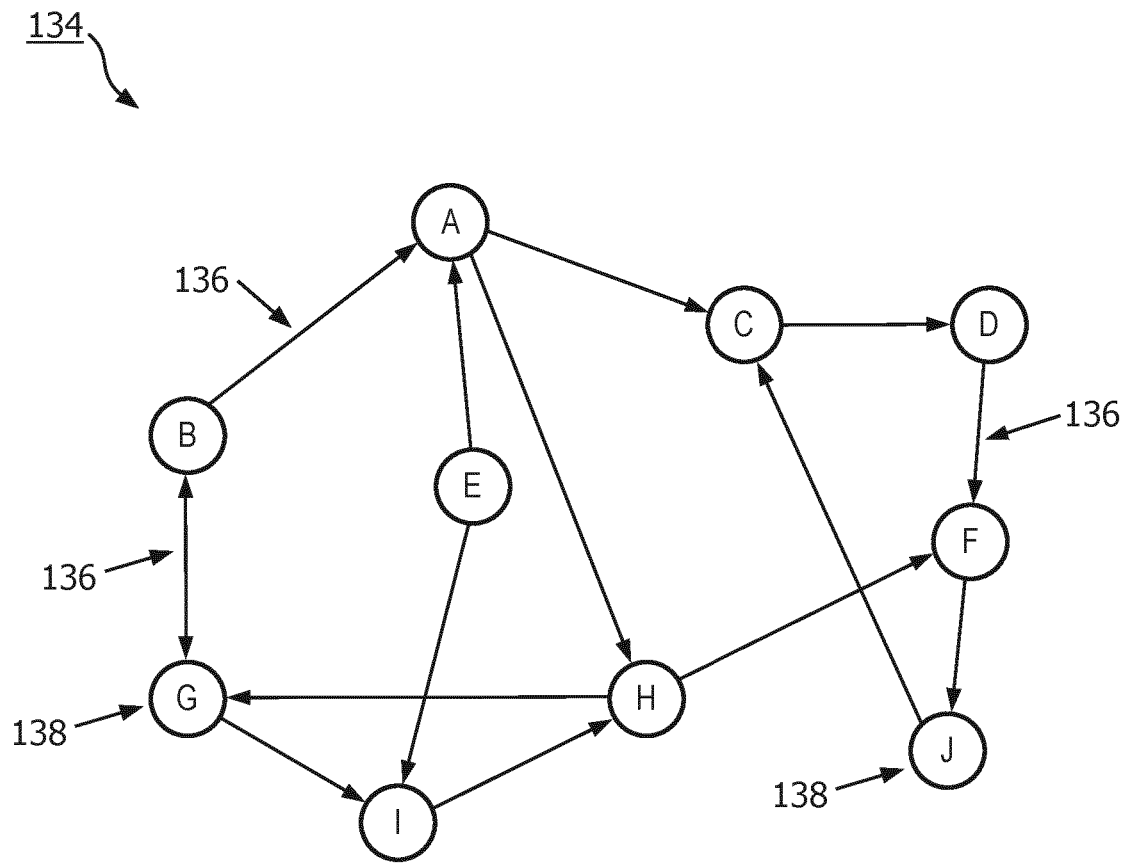
FIG. 5 shows an example relationship graph generated from the extracted relationships from FIG. 4.

With reference to FIG. 2, and with reference to FIGS. 3-5 an illustrative embodiment of an instance of the component co-replacement recommendation method 200 executable by the electronic processor 113 is diagrammatically shown as a flowchart.

At 202, components of a medical device (e.g., an imaging device) are identified by analyzing a technical document 130 related to the medical device. To do so, the identifying of the components in the technical document 130 is based on text extracted from the technical document (e.g., using Natural Language Processing (NLP)) executed by the electronic processor 113. For example, the technical document 130 can be a service manual of the medical device, technical drawings, and so forth, and can be stored in the non-transitory storage medium 127. The technical document 130 can be in any suitable format (e.g., .doc, .pdf, and so forth).

At 204, component symbols 132 representing the components in drawings of the technical document 130 are identified. To do so, the identifying of the component symbols 132 representing the components in the drawings of the technical document is based at least in part on proximity of embedded text in the drawings to symbols in the drawings (e.g., as recognized by the NLP algorithm and an Optical Character Recognition (OCR) process). FIG. 3 shows an example of a technical document 130 having the component symbols 132 and text 134 identified.

At 206, relationships between the components of the medical device based on graphical connections 136 are extracted between the component symbols in the drawings of the technical document 130. In one example embodiment, the extracting of the relationships includes identifying the graphical connections 136 between the component symbols 132 in the drawings. The identified graphical connections are members of a group including at least: connector arrows, undirected connector lines, shaded symbol groupings, and enclosure symbols (e.g., a box enclosing a group of components). The graphical connections 136 can be extracted, for example with a modified Hough transform over the segmented image.

In another example, embodiment, the drawings of the technical document 130 are processed with a Neural Network (NN) implemented in the electronic processor 113 to extract components names from the drawings. For example, the NN can be a Convolutional NN (CNN). In some examples, the NN can be trained with images from training technical documents having annotations of component symbols (e.g. manually labeled) that can be used as ground truth values for error feedback in NN training by backpropagation. FIG. 4 shows an example of the technical document 130 having the graphical connections 136 superimposed thereon. For example, as shown in FIG. 4, pumps of the medical device are labelled with a graphical connection 136 comprising circles (although any other suitable marking or shape can be used, such as boxes). Similarly, the other components of the imaging device are extracted based on the trained NN.

More generally, the extraction of the component symbols and their connections is tailored to the format in which the images are stored. The approach of steps 202, 204, 206 assumes bitmap images. As another example, if the images of the technical document are in a vector image format such as Scalable Vector Graphics (SVG) format, the various symbols of the drawing and their connections are stored as vector graphics elements which can be extracted, along with their embedded text labels, in accordance with the XML format (for SVG) or other vector graphic representation employed.

At 208, a component connections graph 124 is generated that represents the relationships between the components of the medical device. The graph 124 can include nodes corresponding to the components 138 and graphical connections 136 between the components. FIG. 5 shows an example of the generation of the component connections graph 124.

As shown in FIG. 5, the components connection graph 124 can be generated using the extracted graphical connections 136 between the components (labelled as A-J in FIG. 5) of the medical device. The extracted graphical connections 136 are directional relationships. In one example, the directional relationships between a pair of components (e.g., from B to A) as a single directional relationship if the graphical connection between the pair of components in the drawings is a directional graphical connection (e.g., as an arrow). In another example, the directional relationships between a pair of components (e.g., between B and G) as a bidirectional relationship if the graphical connection between the pair of components in the drawings is a non-directional graphical connection (e.g., with no arrowhead, a line with arrowheads at both ends, a shaded area or enclosing box containing component B and G where the shading or enclosing box indicates the components in the shaded or enclosed area are related).

At 209, the electronic processor 113 is programmed to determine distances between pairs of components as shortest distances measured by number of intervening nodes (e.g., components A-J as shown in FIG. 5) between the components in the component connections graph 124. The distance can be determined using, for example, the Floyd-Warshall algorithm. From the determined distances, a pairwise distance matrix 126 (as shown in FIG. 1) is generated. The co-replacement recommendation 122 can be determined using the pairwise distance matrix.

Table 1 (below) shows an example of the pairwise distance matrix 126.

TABLE 1

Relational table with all possible paths

|   | A | B | C       | D    | E | F    | G | H    | I    | J    |
|---|---|---|---------|------|---|------|---|------|------|------|
| A | 0 | — | 1       | 2, 5 | — | 2, 3 | 2 | 1    | 3    | 3, 4 |
| B | 1 | 0 | 2, 5, 6, 8 | 3, 6, 9 | — | 3, 4 | 1 | 2, 3 | 2, 4 | 4, 5 |
| C | ... |   | 0 |      |   |      |   |      |      |      |
| ... | ... |   |         |      |   |      |   |      |      |      |
| J | ... |   |         |      |   |      |   |      |      | 0    |

The pairwise distance matrix 126 of Table 1 is a directional distance matrix. For example, the distance from A to B (A→B) is a null ("-") indicating there is no connection from A to B. Conversely, the distance from B to A (B→A) has a value of 1. A directional pairwise distance matrix advantageously tends to more effectively capture functional relationships between components as compared with a non-directional distances matrix in which the distance X→Y=Y→X for all pairs (X,Y). This is because system functions are usually directional, e.g. failure of a pump delivering pressure to a pressurized component has a reasonably high likelihood of damaging the pressurized component calling for co-replacement of the pressurized component along with the failed pump. By contrast, failure of the pressurized component is typically much less likely to result in damage to the pump. The components connection graph 124 maps out how the components of the imaging device are connected to one another. This facilitates identifying how the replacement of one part affects another part. A form of a path distance between a starting node (e.g., component A) and all the other nodes is computed, which results in the pairwise distance matrix 126. The entries of this matrix 126 are filled as set forth in the following example. As shown in FIG. 5, there are two paths between components A and D (i.e., node A to node D). Hence, there are two entries in the pairwise distance matrix 126—one of the path is A→C→D, giving a weight value of 2 for the first path between node A and node D. The other path between node A and node D is A→H→F→J→C→D, giving a weight of 5 for the second path. The matrix 126 in Table 1 shows each of these weights for the A→D pathway.

For example, if component B is determined to be the component to be replaced, then the relationships between component B and the other components A and C-J can be determined using the pairwise distance matrix. As shown in Table 1, node B is directly mapped to node A, and hence this is indicated with a notation of 1 in the pairwise distance matrix 126. In addition, node C is indirectly connected to node B via the path B→A→C, which has a length of 2. There are also other paths that can be used to reach node C from B, such as the B→A→H→F→J→C path. However, the shortest distance is desired to determine the co-replacement recommendation 122. The possible distance between each component A-J are computed, and the minimum distances are extracted and normalized by the shortest distance value to normalize the pairwise distance matrix 126, as shown in Table 2 below.

TABLE 2

Relational table minimum (optimum) distance

|   | A | B | C | D | E | F | G | H | I | J |
|---|---|---|---|---|---|---|---|---|---|---|
| A | 0 | — | 1 | 2 | — | 2 | 2 | 1 | 3 | 3 |
| B | 1 | 0 | 2 | 3 | — | 3 | 1 | 2 | 2 | 4 |
| C | ... |   | 0 |   |   |   |   |   |   |   |
| ... | ... |   |   |   |   |   |   |   |   |   |
| J | ... |   |   |   |   |   |   |   |   | 0 |

The normalized pairwise distance matrix 126 in Table 2 also provides information about pairs of components that are not affected by each other, that is, which are uncorrelated. For instance, replacement of part B has no effect on part E, and replacement of part A has no effect on part E either. For example, component part A may be a display device. Changing a display unit usually does not affect the functioning of part B which may be a sensor or a computing module. The normalized pairwise distance matrix is a directed matrix since, for example, D(A→B) is not necessarily equal to D(B→A).

Referring back to FIG. 2, the operations 202, 204, 206, 208, 209 are suitably pre-computed to generate the relational table (e.g. Table 2) indicating the directional relationships between pairs of components. The component connections graph output at 208, or equivalently the relational table extracted from it at operation 209, can then be used in generating co-replacement parts recommendations (optionally together with historical co-replacement data if/when available). To this end, at 210, an identification of a component to be replaced is received. As previously described, the SE enters the part number into the entry form 106 via a user input device 103 of the service device 102, where is received by the backend server 111.

At 212, the co-replacement recommendation 122 for the component to be replaced is generated based on the component connections graph 124 (for example, using the matrix 126 extracted from the graph per operation 209). In one example, the co-replacement recommendation 122 includes a co-recommendation of components having a shortest computed distance between each other. In another example, a subset of the components connected with the component to be replaced is identified using the component connections graph 124 (e.g., using the relational table indicating shortest distances in the graph 124) and any retrieved historical data, and the co-replacement recommendation 122 is generated by applying the retrieved historical data to the identified subset of components. In a further example, the subset of components is identified based on a determined distance of the component to be replaced in the component connections graph 124, and the retrieved historical data is applied to the identified subset of components to generate co-replacement recommendation 122. In this example, the determined distance between the components of the plurality of components can be adjusted with the retrieved historical data, and the co-replacement recommendation is generated with the adjusted distance between each component.

In the embodiments disclosed herein where historical data is utilized, an indication of whether the replacement of one component may result in poor performance of another associated part can be determined from the historical data.

From the service logs of the medical device, it can be possible to identify if certain combinations of components have been replaced within a short span of time, and if this pattern occurs multiple times. These components replacement patterns can then be tracked across the entire install base (e.g., all medical imaging devices of the same type as the medical imaging device currently under service whose servicing is being handled by the service provider). For example, if there is a pattern over five years that components A and C have been replaced within a short span of time, for many medical device, this combination can be extracted as a pattern and tabulated as a historical pairwise distance matrix shown in Table 3.

TABLE 3

Relational table based on historical replacements

|   | A | B | C | D | F | G | H | I | J | Total |
|---|---|---|---|---|---|---|---|---|---|---|
| A |   | f(A, B) | f(A, C) | f(A, D) | f(A, F) | f(A, G) | f(A, H) | f(A, I) | f(A, J) |   |
| B | f(B, A) |   | f(B, C) | f(B, D) | f(B, F) | f(B, G) | f(B, H) | f(B, I) | f(B, J) |   |
| C | f(C, A) | f(C, B) |   | f(C, D) | f(C, F) | f(C, G) | f(C, H) | f(C, I) | f(C, J) |   |
| D | f(D, A) | f(D, B) | f(D, C) |   | f(D, F) | f(D, G) | f(D, H) | f(D, I) | f(D, J) |   |
| F | f(F, A) | f(F, B) | f(F, C) | f(F, D) |   | f(F, G) | f(F, H) | f(F, I) | f(F, J) |   |
| G | f(G, A) | f(G, B) | f(G, C) | f(G, D) | f(G, F) |   | f(G, H) | f(G, I) | f(G, J) |   |
| H | f(H, A) | f(H, B) | f(H, C) | f(H, D) | f(H, F) | f(H, G) |   | f(H, I) | f(H, J) |   |
| I | f(I, A) | f(I, B) | f(I, C) | f(I, D) | f(I, F) | f(I, G) | f(I, H) |   | f(I, J) |   |
| J | f(J, A) | f(J, B) | f(J, C) | f(J, D) | f(J, F) | f(J, G) | f(J, H) | f(J, I) |   |   |
| Total |   |   |   |   |   |   |   |   |   |   |

If, for example component B is replaced (e.g., by the SE), the historical pairwise distance matrix of Table 3 suggests other components to be replaced. In the example of component B being replaced, the other components that can be replaced are A, C, D, F, G, H, I, and J (e.g., every component except E) (shown in Table 3 with bold font) where components A and G with least distance of 1.

It will be appreciated that in the above table the replacement of one component might affect another component, but the opposite case may not be true. For example, as shown in FIG. 5, if component B is replaced, then component A can be suggested for replacement, but the replacement of component A may not lead to a suggestion of component B for replacement. The probability of replacing component A given the replacement of component is defined in the following:

$$p(B \backslash A) = \frac{f(B, A)}{f(B, C) + f(B, D) + f(B, F) + f(B, G) + f(B, H) + f(B, I) + f(B, J)}$$

or stated in simpler terms:

$$p(X_i \backslash X_j) = f(X_i, X_j) \bigg/ \sum_{\forall X_j} f(X_i, X_j), \text{ where for all } i, i \neq j$$

In the above example, when component B is replaced, the replacement probability of each affected component is calculated (e.g., the replacement probability of A\B, C\A, D\C, J\F, and so forth). If all $p(X_i \backslash X_j)$ fall in a narrow probability band, then all $X_j$ needs to be replaced. Otherwise the replacement of parts with top a N value (e.g., 3) probabilities with a minimum defined probability of P.

A non-transitory storage medium includes any medium for storing or transmitting information in a form readable by a machine (e.g., a computer). For instance, a machine-readable medium includes read only memory ("ROM"), solid state drive (SSD), flash memory, or other electronic storage medium; a hard disk drive, RAID array, or other magnetic disk storage media; an optical disk or other optical storage media; or so forth.

The methods illustrated throughout the specification, may be implemented as instructions stored on a non-transitory storage medium and read and executed by a computer or other electronic processor.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions executable by at least one electronic processor to perform a component co-replacement recommendation method, the method comprising:
    identifying components of a medical device by analyzing a technical document related to the medical device;
    identifying component symbols representing the components in drawings of the technical document;
    extracting relationships between the components of the medical device based on graphical connections between the component symbols in the drawings of the technical document by identifying graphical connections between the component symbols in the drawings wherein the identified graphical connections are members of a group including at least: connector arrows, undirected connector lines, shaded symbol groupings, and enclosure symbols, the drawings being processed with a Neural Network (NN) to extract component names from the drawings;
    generating a component connections graph representing the relationships between the components of the medical device, the graph including nodes corresponding to the components and connections between the components;
    receiving an identification of a component to be replaced; and
    determining a co-replacement recommendation for the component to be replaced based on the component connections graph.

2. The non-transitory computer readable medium of claim 1, wherein the extracted relationships between the components are directional relationships.

3. The non-transitory computer readable medium of claim 2, wherein the extracting of the directional relationships includes:
    (i) representing a relationship between a pair of components as a single directional relationship if the graphical connection between the pair of components in the drawings is a directional graphical connection; or (ii) representing the relationship between the pair of components as a bidirectional relationship if the graphical connection between the pair of components in the drawings is a non-directional graphical connection.

4. The non-transitory computer readable medium according claim 1, wherein the extracting includes:
    determining distances between pairs of components as shortest distances measured by number of intervening nodes between the components in the component connections graph; and
    generating a pairwise distance matrix using the determined distances;
    wherein the determining of the co-replacement recommendation uses the pairwise distance matrix.

5. The non-transitory computer readable medium according to claim 4, wherein the distances are determined using the Floyd-Warshall algorithm.

6. The non-transitory computer readable medium according to claim 1, wherein the extracting includes:
    retrieving, from a database, historical co-replacement data related to the components;
    wherein the determining of the co-replacement recommendation is further based on the retrieved historical data.

7. The non-transitory computer readable medium of claim 6, wherein the determining of the co-replacement recommendation includes:
    identifying a subset of the components connected with the component to be replaced using the component connections graph; and
    applying the retrieved historical data to the identified subset of components to generate the co-replacement recommendation.

8. The non-transitory computer readable medium of claim 6, wherein the method further includes:
    identifying a subset of the components within a determined distance of the component to be replaced in the component connections graph; and
    applying the retrieved historical data to the identified subset of components to generate co-replacement recommendation.

9. The non-transitory computer readable medium of claim 8, wherein the method further includes:
    adjusting the determined distances between the components of the plurality of components with the retrieved historical data; and
    generating the co-replacement recommendation with the adjusted distances between each component.

10. The non-transitory computer readable medium of claim 1, wherein the identifying of the components in the technical document is based on text extracted from the technical document.

11. The non-transitory computer readable medium of claim 10, wherein the identifying of the component symbols representing the components in the drawings of the technical document is based at least in part on proximity of embedded text in the drawings to symbols in the drawings.

12. A service device, comprising:
    a display device;
    at least one user input device; and
    at least one electronic processor programmed to:
        receive, via the at least one user input device, an identification of a component of a medical device to be replaced;
        identify components of the medical device by analyzing one or more drawings of a technical document related to the medical device including processing the one or more drawings with a Neural Network (NN) to extract component names;
        generate a component connections graph representing relationships between the components of the medical device, the graph including nodes corresponding to the components and connections between the components;
        determine distances between pairs of components as shortest distances measured by number of intervening nodes between the components in the component connections graph and generate a pairwise distance matrix using the determined distances;
        generate a co-replacement recommendation for the component to be replaced based on a-the pairwise distance matrix generated from the component connections graph; and
        provide, on the display device, the co-replacement recommendation.

13. The service device of claim 12, wherein the at least one electronic processor programmed to:
    retrieve, from a database, historical co-replacement data related to the components;
    wherein the generating of the co-replacement recommendation is further based on the retrieved historical data.

14. A component co-replacement recommendation method, the method comprising:
    identifying a plurality of components of a medical device by analyzing one or more drawings of a technical document related to the medical device including processing the one or more drawings with a Neural Network (NN) to extract component names from the drawings;
    extracting a relationship between each component of the plurality of components of the medical device indicative of co-replacement recommendations amongst each component identified from the technical information, wherein the extracted relationships between the components are directional relationships in which the relationship between a pair of components is a single directional relationship if the graphical connection between the pair of components in the drawings is a directional graphical connection, or is a bidirectional relationship if the graphical connection between the pair of components in the drawings is a non-directional graphical connection;
    generating a component co-replacement recommendation graph showing the relationships between each component of the plurality of components of the medical device, the graph including nodes corresponding to the components and connections shown between the components;
    receiving, via at least one user input device, an identification of a component of the medical device to be replaced;
    generating a co-replacement recommendation for the component to be replaced based on a component connections graph representing relationships between components of the medical device that includes the component to be replaced, the graph including nodes corresponding to components of the medical device and connections between pairs of components the connections representing distances between the components of the connection in the one or more drawings of the technical document; and
    providing, on a display device, the component co-replacement recommendation.

15. The method according to claim 14, wherein the extracting includes:
   retrieving, from a database, historical co-replacement data related to the components;
   wherein the determining of the co-replacement recommendation is further based on the retrieved historical data.

* * * * *